M. Devault,
Plow Grinder.
No. 102,508.      Patented May 3, 1870.
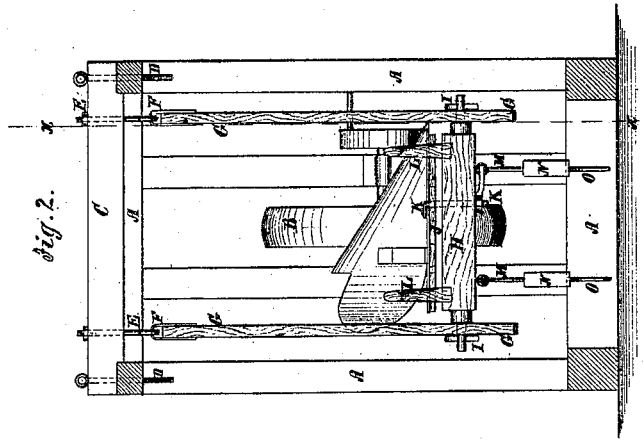
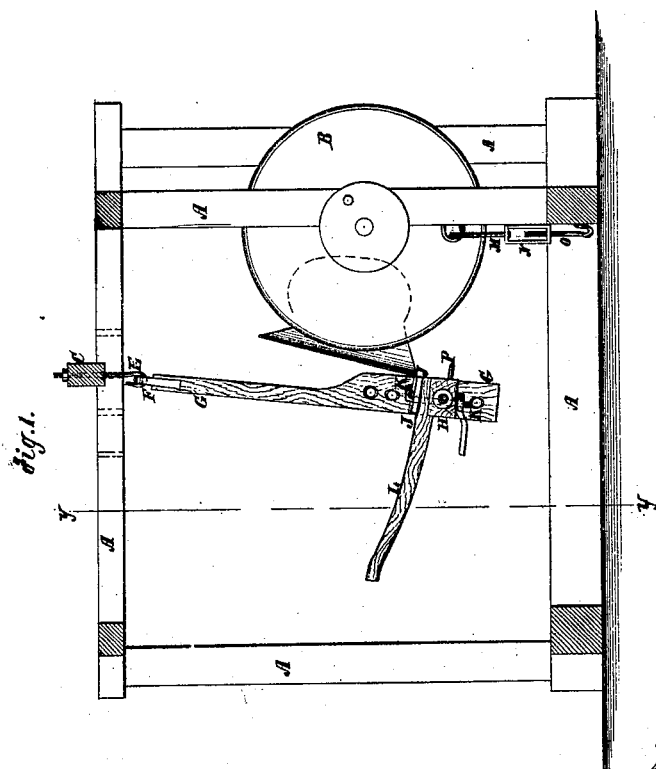
Witnesses:
Inventor:
M. Devault
Per 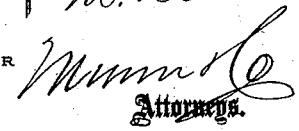
Attorneys.

UNITED STATES PATENT OFFICE.

MICHAEL DEVAULT, OF CHARLESTON, ILLINOIS.

IMPROVEMENT IN PLOW GRINDERS AND POLISHERS.

Specification forming part of Letters Patent No. 102,508, dated May 3, 1870.

*To all whom it may concern:*

Be it known that I, MICHAEL DEVAULT, of Charleston, in the county of Coles and State of Illinois, have invented a new and useful Improvement in Plow Grinders and Polishers; and I do hereby declare that the following is a full, clear, and exact description thereof, which will enable others skilled in the art to make and use the same, reference being had to the accompanying drawings, forming part of this specification.

Figure 1 is a vertical section of my improved machine, taken through the line $x\,x$, Fig. 2. Fig. 2 is a vertical section of the same, taken through the line $y\,y$, Fig. 1.

Similar letters of reference indicate corresponding parts.

My invention has for its object to furnish a simple and convenient machine for grinding and polishing plows, which shall be so constructed and arranged as to support and hold the plow securely and in such a way that it may be moved about and adjusted to the stone or wheel quickly and accurately; and it consists in the construction and combination of various parts of the machine, as hereinafter more fully described.

A is the frame of the machine.

B represents a grinding or polishing stone or wheel, the journals of which revolve in bearings attached to the frame-work A, and which may be driven by any convenient power.

C is a cross-beam, the ends of which rest upon the upper longitudinal bars of the frame A, to which they are adjustably connected by pins D, which pass down through holes in the ends of the said cross-beam and through one or the other of the holes in the bars of the frame A, so that the device may be easily and quickly adjusted nearer to or farther from the stone or wheel B, as may be desired.

E are two bolts, which may pass up through the cross-beam C, and are secured in place by nuts placed upon their upper ends.

Upon the lower ends of the bolts E are formed hooks, upon which are hooked the eyes or loops F, attached to the upper ends of the swinging bars G, the lower parts of which have several holes formed in them to receive the journals formed upon the ends of the beam H, to pivot the said beam to the said bars. The journals of the beam H are secured in place in the bars G by spring-keys I or other easily-detachable means, so that the said beam may be quickly adjusted higher or lower, as may be desired.

To one side of the beam H is attached a spring-plate, J, to the face of which the plow is clamped, while being ground or polished, by the clamping-bolts K, upon the upper ends of which are formed hooks to take hold of the plow, and which pass through holes in the spring-plate J and beam H, and are secured in place by hand or lever nuts placed upon their lower ends.

L are handles attached to the pivoted beam H, for convenience in holding and adjusting it while grinding and polishing the plows.

M are rods, the ends of which are pivoted to the posts of the frame A, that support the stone or wheel B, and to the other end of which are swiveled the long nuts N, into the other ends of which are screwed the ends of the rods O. Upon the other ends of the rods O are formed hooks, to hook into staples or eyebolts P, attached to the pivoted beam H.

The device M N O is designed to hold the beam H steady, and adapt it to serve as a rest when turning down or truing the stone when it may have become rough or uneven.

Having thus described my invention, I claim as new and desire to secure by Letters Patent—

1. The combination of the adjustable cross-beam C, swinging bars G, adjustably-pivoted beam H, and handles L, whether the spring-plate J be used or not with each other, substantially as herein shown and described, and for the purpose set forth.

2. The combination of the adjustable device M N O, or equivalent, with the adjustable pivoted beam H, swinging bars G, and adjustable cross-beam C, substantially as herein shown and described, and for the purpose set forth.

MICHAEL DEVAULT.

Witnesses:
 W. H. BUNNELL,
 HENRY T. FROST.